(No Model.)

E. C. TAYLOR.
ARTIFICIAL TOOTH.

No. 451,959. Patented May 12, 1891.

Attest
Sidney P. Hollingsworth
Baltus DeLong

Inventor
ELBERT C. TAYLOR
by his attorneys
Baldwin, Davidson & Wight

UNITED STATES PATENT OFFICE.

ELBERT C. TAYLOR, OF HUMANSVILLE, ASSIGNOR OF ONE-HALF TO EDWARD N. LA VEINE, OF KANSAS CITY, MISSOURI.

ARTIFICIAL TOOTH.

SPECIFICATION forming part of Letters Patent No. 451,959, dated May 12, 1891.

Application filed January 23, 1891. Serial No. 378,800. (No model.)

*To all whom it may concern:*

Be it known that I, ELBERT C. TAYLOR, a citizen of the United States, residing at Humansville, Polk county, Missouri, have invented certain new and useful Improvements in Artificial Teeth and in the Process of Securing them to the Base-Plates or Artificial Dentures, of which the following is a specification.

It is customary to secure artificial teeth to the base-plate by means of pins, which are secured by baking the teeth around the pins; but it is much better and easier to first form the tooth and then secure in place the pin or fastening device. Heretofore difficulty has been experienced in securing a strong and secure connection between the pin and the tooth when thus fastened.

According to my present invention the tooth is first formed with a recess and a fastening-wire of suitable shape is seated in this recess and securely fastened therein. The details of construction and the manner in which the fastening device is secured to the tooth will be hereinafter more fully explained.

Figure 1:
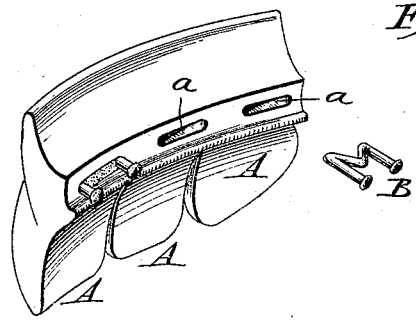
Figure 2:
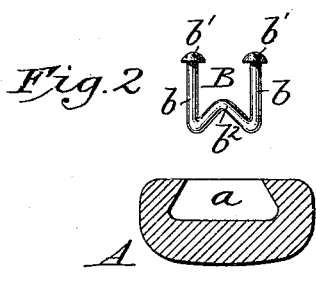
Figure 3:
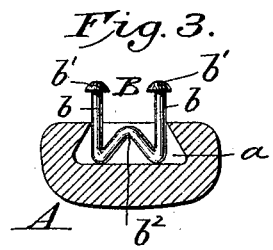
Figure 4:
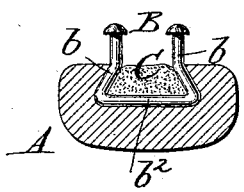

In the accompanying drawings, Figure 1 is a perspective view of a block of artificial teeth, showing also my improved fastening devices. Fig. 2 is a transverse section of a tooth with one of my improved fastening devices in position ready to be inserted in the recess in the tooth. Fig. 3 is a similar view showing the fastening device inserted in the recess. Fig. 4 is a similar view showing the fastening device seated and secured in the recess.

I first form and bake the tooth A, which is provided with an undercut recess $a$ in its rear face. The fastening device or wire B is first formed with parallel sides $b$, having headed ends $b'$ and a bent or curved bendable connecting-brace $b^2$. A fastening device thus formed is shown in Fig. 2 ready to be inserted into the recess $a$, which at its outer end is just wide enough to receive the wire B. In Fig. 3 the wire B is shown in position in the recess $a$. When in this position, I bend or straighten out the brace portion $b^2$ by forcing inwardly with a suitable tool applied to the central portion of the brace, by which means the brace $b^2$ is flattened or made straight, as shown in Fig. 4, which at the same time causes the inner ends of the sides $b$ of the device to spread apart in opposite directions and rest against the undercut sides of the recess. The device B is of such a size and construction as to cause the brace $b^2$ and the lower ends of the sides $b$ to fit snugly against the bottom and opposite sides of the recess, as is clearly shown in Fig. 4. That portion of the recess $a$ not occupied by the wire is filled in with suitable material C. This way of fastening the wire to the tooth is simple and secure. It cannot be withdrawn from the recess, because the lower bent ends of the brace $b$ are inclined in opposite directions and rest against the inclined or undercut portions of the recess. The lower ends cannot be bent inwardly, because they are held apart and braced by the portion $b^2$.

I claim as my invention—

1. A fastening device for artificial teeth, formed with parallel sides, and a bent-up or curved brace extending inwardly between the sides and adapted to be forced outwardly to force the sides into the undercut recess of an artificial tooth, substantially as set forth.

2. The process herein described, which consists in forming an artificial tooth with an undercut recess, inserting into the recess a fastening device or wire having parallel sides $b$ and a curved or bent portion $b^2$, then flattening out the bent portion, and then filling in the recess with suitable material.

In testimony whereof I have hereunto subscribed my name.

ELBERT C. TAYLOR.

Witnesses:
VIRGINIA AMOLDIA,
MARIE DELAFOSSE.